US007168389B2

(12) United States Patent
Piedmont

(10) Patent No.: US 7,168,389 B2
(45) Date of Patent: Jan. 30, 2007

(54) SWIVELING BANNER-CARRYING APPARATUS

(76) Inventor: Gregory H. Piedmont, 1035 S. Johnson Ave., El Cajon, CA (US) 92020

( * ) Notice: Subject to any disclaimer, the term of this patent is extended or adjusted under 35 U.S.C. 154(b) by 0 days.

(21) Appl. No.: 10/838,880

(22) Filed: May 1, 2004

(65) Prior Publication Data

US 2005/0241566 A1 Nov. 3, 2005

(51) Int. Cl.
*G09F 17/00* (2006.01)
*F16B 5/06* (2006.01)

(52) U.S. Cl. ................. 116/174; 403/397; 248/223.41; 248/316.7

(58) Field of Classification Search ................ 116/173, 116/174, 28 R; 248/223.41, 316.7, 231.81, 248/229.25, 230.7; 24/460, 462, 459; 403/397, 403/387, 384; 73/170.05, 170.06, 170.07; 40/606.14, 584, 601, 591, 218, 607.01
See application file for complete search history.

(56) References Cited

U.S. PATENT DOCUMENTS 1,062,850 A * 5/1913 Pratt .......................... 116/174
1,728,079 A * 9/1929 Power .......................... 40/613
1,751,433 A * 3/1930 Power ...................... 73/170.05
2,799,240 A * 7/1957 Andrews .................... 116/174
3,049,008 A * 8/1962 Morton ..................... 73/170.03
3,127,869 A * 4/1964 Howland .................... 116/173
3,323,486 A * 6/1967 Woolf ........................ 116/173
4,052,957 A * 10/1977 Lee ............................ 116/174
4,402,220 A * 9/1983 Kuhlmann et al. ...... 73/170.03
4,727,822 A * 3/1988 Wikkerink .................. 116/174
4,864,962 A * 9/1989 Kuehl et al. ................ 116/174
5,042,418 A * 8/1991 Hoover et al. .............. 116/173
5,044,301 A * 9/1991 Peters et al. ................ 116/174
5,279,250 A * 1/1994 Palermo et al. ............. 116/174
5,299,525 A * 4/1994 Romesburg ................. 116/173
5,383,420 A * 1/1995 Dundorf ...................... 116/174
5,481,244 A * 1/1996 Dicke ......................... 340/473
5,615,635 A * 4/1997 Deviney ...................... 116/173
5,727,497 A * 3/1998 Nichols, Jr. ................. 116/173
5,811,673 A * 9/1998 Kwok et al. ............. 73/170.05
5,975,009 A * 11/1999 Nihra et al. ................ 116/174
6,637,365 B1 * 10/2003 Adamski .................. 116/28 R
6,725,972 B1 * 4/2004 Krier et al. ................. 182/187
6,748,683 B1 * 6/2004 Schultz ........................ 40/218
6,799,530 B1 * 10/2004 Heichelbech ............... 116/174
6,807,924 B1 * 10/2004 Christiansen ............... 116/174
6,923,141 B1 * 8/2005 Staats et al. ................ 116/173

FOREIGN PATENT DOCUMENTS

DE 2943109 A * 5/1981

* cited by examiner

*Primary Examiner*—R. Alexander Smith
(74) *Attorney, Agent, or Firm*—Charmasson, Buchaca & Leach, LLP

(57) ABSTRACT

A banner-carrying apparatus which reduces the folding and winding up of the banner or flag about the banner-carrying pole by using a tubular sleeve coaxially, annularly and rotatively mounted about a flag pole shaft. Low friction bearing surfaces allow the sleeve to freely rotate unwinding, through the force of gravity, a flag which has been wound upon it. Specialized clamps provide adjustable and releasable securing of the flag to the sleeve.

4 Claims, 3 Drawing Sheets

SWIVELING BANNER-CARRYING APPARATUS

FIELD OF THE INVENTION

This invention relates to banner-carrying apparatuses and more particularly to flag poles for carrying flags.

BACKGROUND OF THE INVENTION

The display of flags has grown in popularity, particularly with renewed patriotism and the growing popularity of seasonal flags displayed outside the home. Such flags are typically mounted upon the house wherein the flag pole is typically oriented between 30° and 90° angle from vertical. In this orientation the flag is subject to become wound upon, tangled and wrapped around the flag pole through even moderate swirling winds, reducing their display appeal. It is therefore desirable to provide a mechanism which avoids the wrapping and folding of such banners or flags.

SUMMARY OF THE INVENTION

The principal and secondary objects of the invention are to provide a banner-carrying apparatus in which the folding and winding up of the banner about the flag-carrying pole is reduced or eliminated.

These and other valuable objects are achieved by a tubular sleeve sized and shaped to fit annularly and rotatively about a flag pole shaft. Low friction bearing surfaces allow the sleeve to freely rotate unwinding, through the force of gravity, a flag which has been wound upon it. Specialized clamps provide adjustable and releasable securing of the flag to the sleeve.

DESCRIPTION OF THE PREFERRED EMBODIMENT OF THE INVENTION

Figure 1:
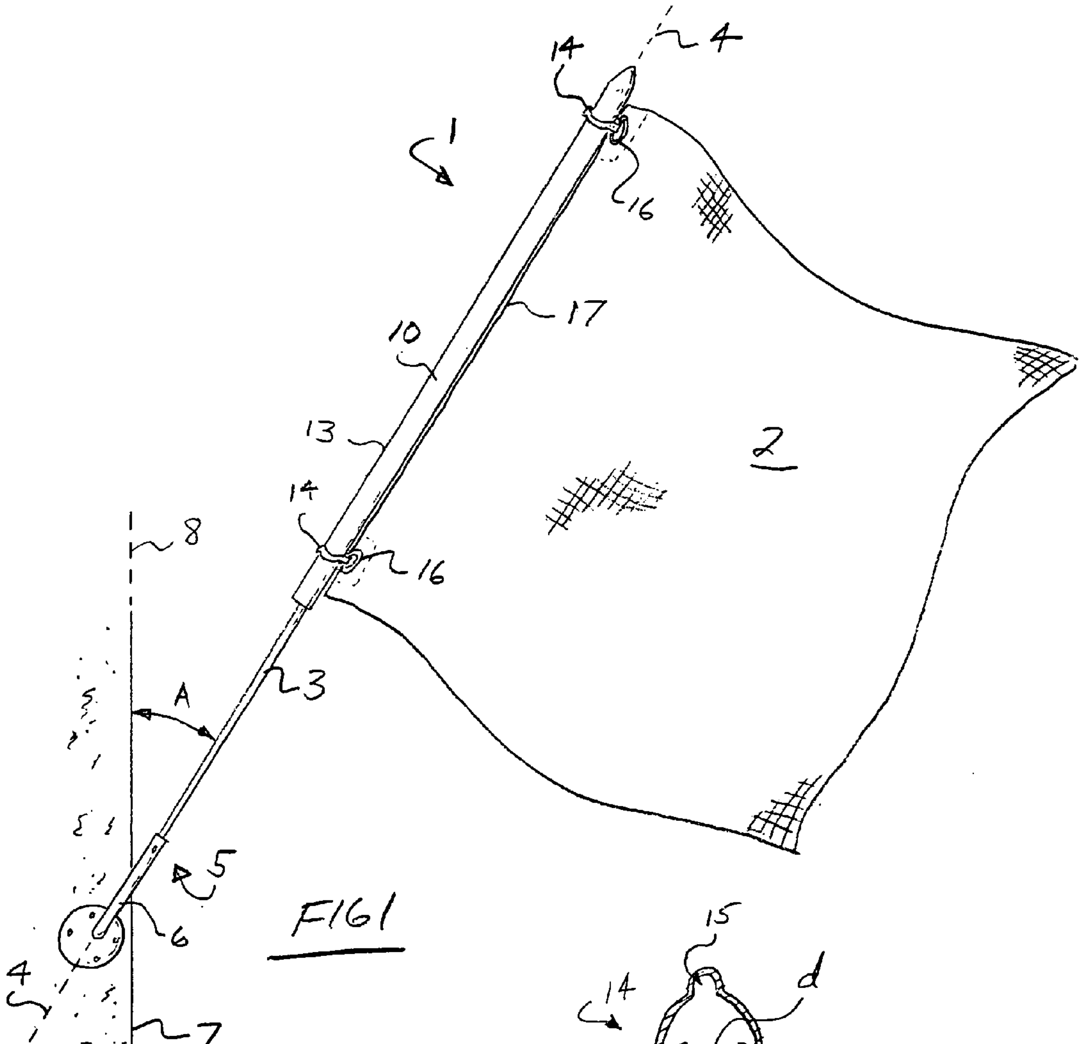
FIG. 1 is a diagrammatic partial side perspective view of a flag pole according to the invention, carrying the flag mounted upon a wall of a house.
Figure 2:
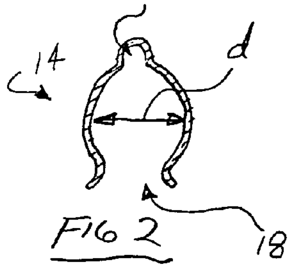
FIG. 2 is a diagrammatic cross-sectional top view of the snap clamp feature according to the invention.
Figure 3:
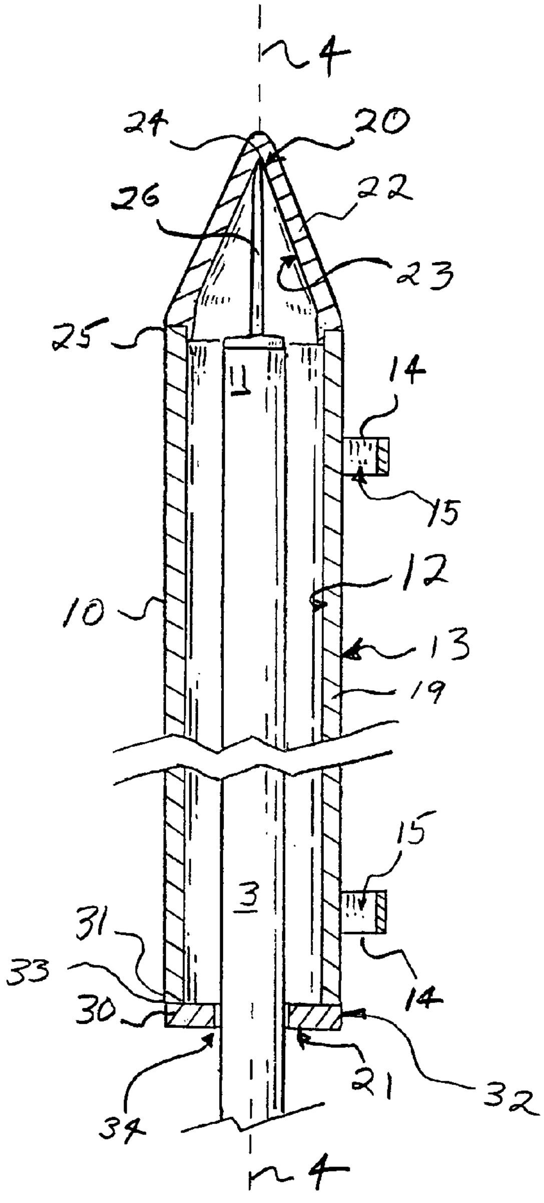
FIG. 3 is a diagrammatic partial cross-sectional cutaway side view of a flag-carrying apparatus according to the invention.

Referring now to the drawing, there is shown in FIGS. 1–3, a pliable banner-carrying pole 1 which avoids tangling or wrapping of, the banner 2 about the pole. The apparatus is formed by an oblong substantially rigid cylindrical shaft or rod 3 having a central longitudinal axis 4 and has a lower first end 5 adapted to mount in a holder 6 attached to a fixed structure 7. The rod is mounted in an orientation wherein the angle A formed between the axis 4 and verticle 8 is generally between 30° and 90°. A substantially rigid body in the form of a substantially cylindrical tubular hollow sleeve 10 formed from durable rigid material such as polyvinylchloride plastic is rotatively and coaxially mounted upon the opposite end portion 11 of the rod. The sleeve is formed to have an inner cavity bounded by the inner surface 12 of the substantially cylindrical sidewall 19 of the sleeve. The sidewall also forms an outer surface 13 of the sleeve. Substantially cylindrical open ended steel snap clamps 14 snap over the outer surface 13 of the sleeve and remain in place due to friction, thereby releaseably engaging the sleeve and act as fasteners for securing the banner to the sleeve. Therefore, the inner diameter “d” of the clamp is selected to be slightly smaller than the diameter of the outer surface 13 of the sleeve. Each of the clamps are formed to have a generally U-shaped hoop portion 15 which penetrates mounting rings 16 correspondingly mounted along the peripheral edge 17 of the banner 2 proximate to the pole. The opening 18 of the clamp, therefore, is located on the oposite side of the sleeve from the peripheral edge 17.

The inner diameter of the sleeve 10 is substantially greater than the outer diameter of the rod 3. The sleeve 10 is rotatively mounted upon the end 11 of the rod 3 by means of a pair of bearings 20, 21. A first top bearing 20 is formed by an end cap 22 having a substantially conical inner surface 23 wherein the vertex of the conical inner surface forms a pit 24 substantially in line with the axis 4 of the rod. The cap is coaxially attached to the top end 25 of the sleeve. A bearing spike 26 extends axially upward from the upper end 11 of the rod and engages the pit 24 at a tapered, sharp end point. This provides a low friction point rotational top bearing 20. The spike is preferably made from steel or other durable material. The end cap is preferably made from steel or other durable material which over time will not be penetrated by the spike.

A second bearing 21 in the form of a nylon disk 30 is attached to the opposite bottom end 31 of the sleeve. The disk is substantially washer-shaped to have a substantially circular outer wall 32 commensurate with the outer wall 10 of the sleeve and is bonded at a joint 33 to the sleeve. A substantially cylindrical central hole 34 in the disk-shaped bearing is sized to allow intimate passage and free movement of the rod therein but to prevent all but minor pitch and yaw movement of the sleeve with respect to the rod.

In this way, the sleeve may rotate more than 360° in relation to the fixed pole.

Figure 4:
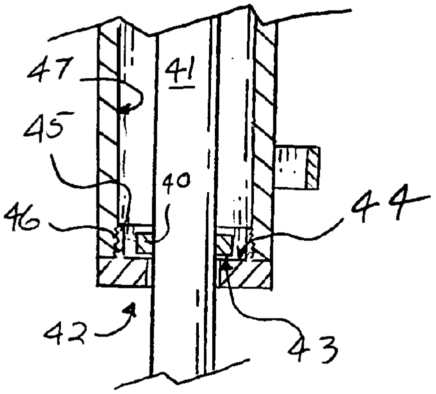
FIG. 4 is a diagrammatic partial cross-sectional side view showing an alternate embodiment of the lower bearing of the flag-carrying apparatus according to the invention.

Referring now to FIGS. 1 and 4, there is shown an alternate embodiment of the lower bearing for poles mounted at angles A close to and beyond 90° from vertical. Such orientations can lead to the sleeve axially separating away from the upper end of the rod. In this embodiment, a retaining ring 40 is mounted to the rod 41 and axially located proximate to the second bottom disk-shaped bearing 42.

The ring is made from durable, low-friction material such as nylon and provides a low friction surface 43 for bearing against the inner surface 44 of the second disk-shaped bearing 42. The second disk-shaped bearing 42 is now formed to have an upper cylindrical prominence 45 having outer corrugations 46 for enhancing friction between the bearing and the inner wall 47 of the sleeve and thus, removably attach the second bearing to the sleeve.

Figure 5:
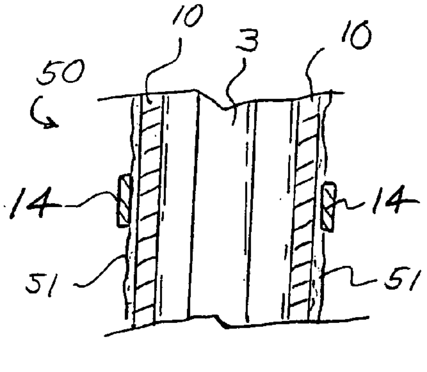
FIG. 5 is a diagrammatic partial cross-sectional side view of a sleeved flag secured upon a flag-carrying apparatus according to the invention.

Referring now to FIG. 5, there is shown the pole configuration 50 wherein a flag 51 made from a pliable sheet material such as nylon fabric and is formed to have an oblong pocket extending along the length of its peripheral edge adjacent to the pole. The pocket is slipped over the outside of the sleeve 10 rotatively mounted upon the rod 3. For this type of flag, the snap clamps 14 are used to snap over the flag from the opposite side to secure the flag to the sleeve. In this way, the opening 18 of the clamp is located on the side of the sleeve adjacent to the flapping portion of the flag.

Figure 6:
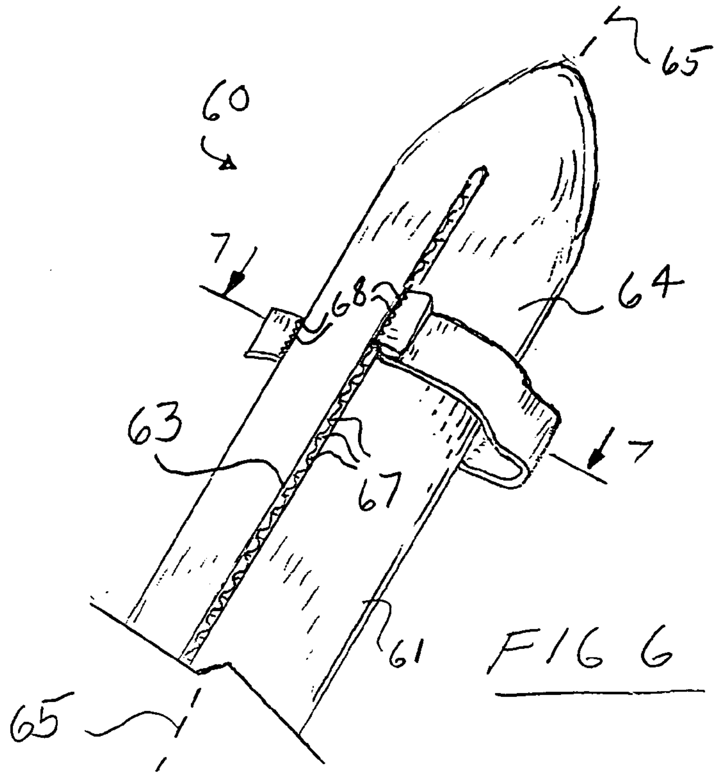
FIG. 6 is a diagrammatic partial side perspective view showing an alternate embodiment of the sleeve portion of the pole adapted to have a longitudinal ribbed channel and toothed clamp engagement.
Figure 7:
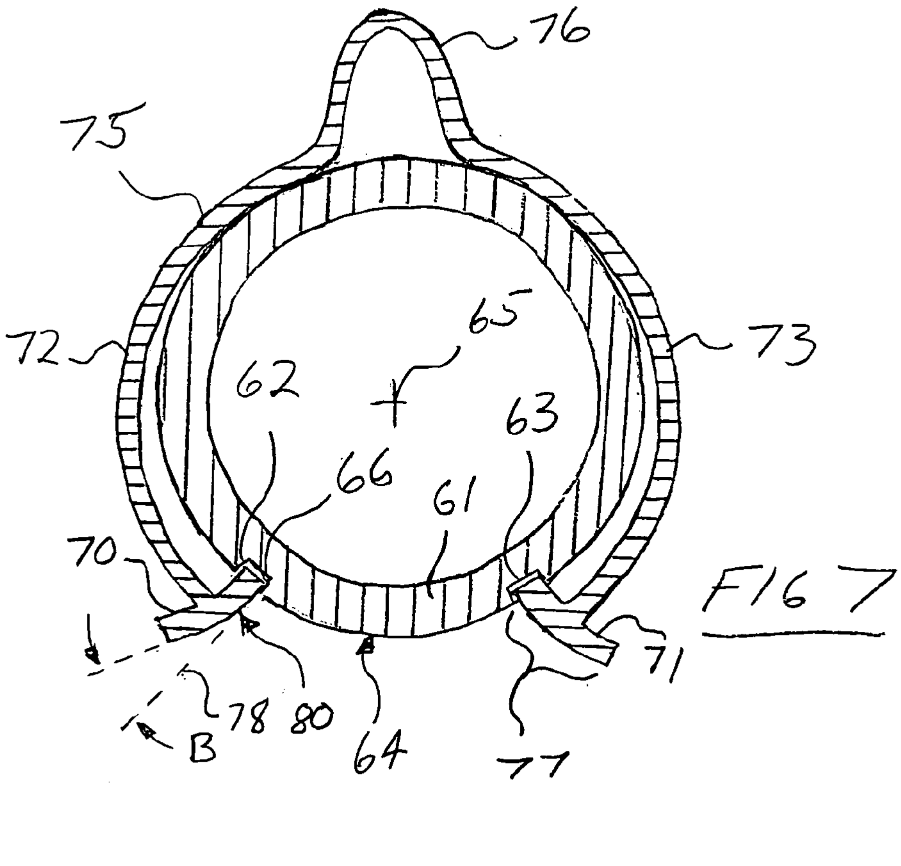
FIG. 7 is a diagrammatic cross-sectional top view of the sleeve and clamp shown in FIG. 6.

Referring now to FIGS. 6–7, there is shown an alternate embodiment of the pole 60 where the substantially rigid hollow and substantially cylindrical sleeve 61 has a pair of oblong longitudinal channels 62, 63 set into the outer surface 64 of the sleeve. Each channel is oriented substantially parallel to the axis of rotation 65 of the sleeve. The most radially inward or bottom surface 66 of each channel is formed to have a plurality of uniformly spaced apart humps 67 sized and shaped to interlock with teeth 68 formed onto the radially, inwardly projecting jaw portions 70, 71, on each of the opposing arms 72, 73 of a snap-clamp 75. In this way, each of the humps can act as an axially restrictive prominence preventing axial movement of the clamp with respect to the sleeve. Because there are a plurality of uniformly spaced apart humps, the axial position of the clamps is adjustable to accommodate for example flags having differently spaced apart mounting rings.

The clamp 75 also has a substantially U-shaped hoop 76 similar to the previous embodiment. The clamp is preferably formed from a durable, resilient material such as steel. In a further adaptation, each of the jaws are formed into a broadened prong portion 77 to facilitate easy radial insertion of the clamp over the sleeve. The orientation of this prong portion is selected to be formed at an angle B away from the directly radial direction 78 to further facilitate mounting over the sleeve. The prong can be further formed to have a convex surface 80 to further facilitate mounting over the sleeve.

What is claimed is:

1. A banner-carrying apparatus which comprises:

an oblong rigid rod having a top extremity;

a substantially rigid tubular sleeve sized and shaped to coaxially and rotatively mount over said rod;

said sleeve defining a central cavity having a lower end and an opposite upper end;

a cap closing said upper end, said cap having an axial pit conically tapering to a closed vertex;

a bearing spike projecting axially from said top extremity and having a tapered sharp end point engaging said axial pit;

a banner secured to said sleeve;

at least one snap-clamp sized and shaped to releasably, annularly and stationarily engage said sleeve and an edge of said banner;

wherein said sleeve has at least one groove extending along the length of said sleeve; and said snap-clamp comprises an inwardly projecting jaw portion extending into said groove.

2. The apparatus of claim 1 wherein said sleeve has two parallel ones of said groove; and, said snap-clamp further comprises one of said jaw portion at each opposite ends thereof.

3. The apparatus of claim 2 wherein said sleeve further comprises a plurality of radial humps in each of said ones of said groove; and said jaw portion has a plurality of teeth shaped and dimensioned to interlock with said humps.

4. The apparatus of claim 2 wherein said snap-clamp further comprises a U-shaped hoop portion for attachment of said banner.

* * * * *